(12) United States Patent
Tamura

(10) Patent No.: US 7,327,953 B2
(45) Date of Patent: Feb. 5, 2008

(54) ZOOM LENS AND IMAGING DEVICE

(75) Inventor: Masaki Tamura, Kanagawa (JP)

(73) Assignee: Sony Corporation (JP)

( * ) Notice: Subject to any disclaimer, the term of this patent is extended or adjusted under 35 U.S.C. 154(b) by 207 days.

(21) Appl. No.: 10/531,948

(22) PCT Filed: Sep. 8, 2004

(86) PCT No.: PCT/JP2004/013395

§ 371 (c)(1),
(2), (4) Date: Apr. 19, 2005

(87) PCT Pub. No.: WO2005/026809

PCT Pub. Date: Mar. 24, 2005

(65) Prior Publication Data
US 2006/0051082 A1 Mar. 9, 2006

(30) Foreign Application Priority Data
Sep. 8, 2003 (JP) ............... 2003-315070

(51) Int. Cl.
G03B 17/00 (2006.01)

(52) U.S. Cl. .............. 396/72; 359/676; 359/678; 359/763; 359/764

(58) Field of Classification Search .............. 396/72; 359/676, 678, 763, 764
See application file for complete search history.

(56) References Cited

U.S. PATENT DOCUMENTS 5,633,759 A 5/1997 Nagata et al.
5,751,499 A * 5/1998 Inadome .............. 359/699
5,774,276 A * 6/1998 Inadome .............. 359/699
5,790,317 A * 8/1998 Inadome .............. 359/691
5,991,091 A 11/1999 Hayakawa
6,104,432 A * 8/2000 Nakamura et al. ...... 348/360
6,400,515 B1 * 6/2002 Kohno ................ 359/675

(Continued)

FOREIGN PATENT DOCUMENTS

CN 1388908 A 1/2003

(Continued)

OTHER PUBLICATIONS

International Search Report mailed Jan. 11, 2005.

(Continued)

Primary Examiner—Patrick Assouad
Assistant Examiner—Warren K Fenwick
(74) Attorney, Agent, or Firm—Radar Fishman & Grauer PLLC; Ronald P. Kananen

(57) ABSTRACT

A zoom lens with a reduced thickness and size in the depthwise direction consists of a plurality of lens groups (GR1 to GR5), so that it varies in power in response to variation in intervals between the lens groups. The zoom lens also has a prism G2 to bend the optical axis passing through the lens groups (GR1 to GR5). The last lens group G5 (counted from the object side) is composed of a negative lens group and a positive lens group, with an air layer interposed between them (arranged sequentially from the object side). The present invention also provides an imaging device equipped with an imaging element to convert the optical images formed by said zoom lens into electrical signals.

16 Claims, 16 Drawing Sheets

U.S. PATENT DOCUMENTS

| | | | |
|---|---|---|---|
| 6,633,436 B2 * | 10/2003 | Wada et al. | 359/681 |
| 6,650,484 B2 | 11/2003 | Kitaoka et al. | |
| 6,865,027 B2 * | 3/2005 | Shirasuna | 359/690 |
| 6,867,922 B1 * | 3/2005 | Terasawa et al. | 359/649 |
| 7,113,345 B2 * | 9/2006 | Mihara et al. | 359/676 |
| 7,177,094 B2 | 2/2007 | Mihara et al. | |
| 2001/0046383 A1 * | 11/2001 | Hagimori et al. | 396/72 |
| 2002/0191304 A1 | 12/2002 | Kitaoka et al. | |
| 2003/0160902 A1 | 8/2003 | Mihara et al. | |
| 2003/0161620 A1 | 8/2003 | Hagimori et al. | |
| 2003/0206352 A1 | 11/2003 | Mihara et al. | |
| 2004/0169764 A1 | 9/2004 | Ishii et al. | |
| 2005/0237626 A1 * | 10/2005 | Park | 359/683 |
| 2006/0002694 A1 * | 1/2006 | Mihara et al. | 396/72 |

FOREIGN PATENT DOCUMENTS

| | | |
|---|---|---|
| JP | 04-013109 | 1/1992 |
| JP | 08-248318 | 9/1996 |
| JP | 2750775 | 2/1998 |
| JP | 11-052245 | 2/1999 |
| JP | 11-194268 | 7/1999 |
| JP | 2000-131610 | 5/2000 |
| JP | 2000-221393 | 8/2000 |
| JP | 2001-350093 | 12/2001 |
| JP | 2002-72088 | 3/2002 |
| JP | 2003-029146 | 1/2003 |
| JP | 2003-043354 | 2/2003 |
| JP | 2003-202500 | 7/2003 |
| JP | 2004-037925 | 2/2004 |
| JP | 2004-037926 | 2/2004 |
| JP | 2004-170707 | 6/2004 |

OTHER PUBLICATIONS

International Search Opinion mailed Jan. 11, 2005.

Australian Patent Office-Written Opinion, Application No. SG 200600868-4, dated Sep. 8, 2004. Mailing Date: Oct. 24, 2006.

Notification of Transmittal of Copies of Translation of the International Preliminary Report of Patentability (Form PCT/IB/338), International Application No. PCT/JP2004/013395, International Filing date: Sep. 8, 2004.

Chinese 1st Office Action; Application No. 2004800012041; Dated: Oct. 13, 2006.

Chinese 2nd Office Action; Application No. 20048000112041; Dated Apr. 20, 2007.

Japanese Office Action 2003-315070.

* cited by examiner

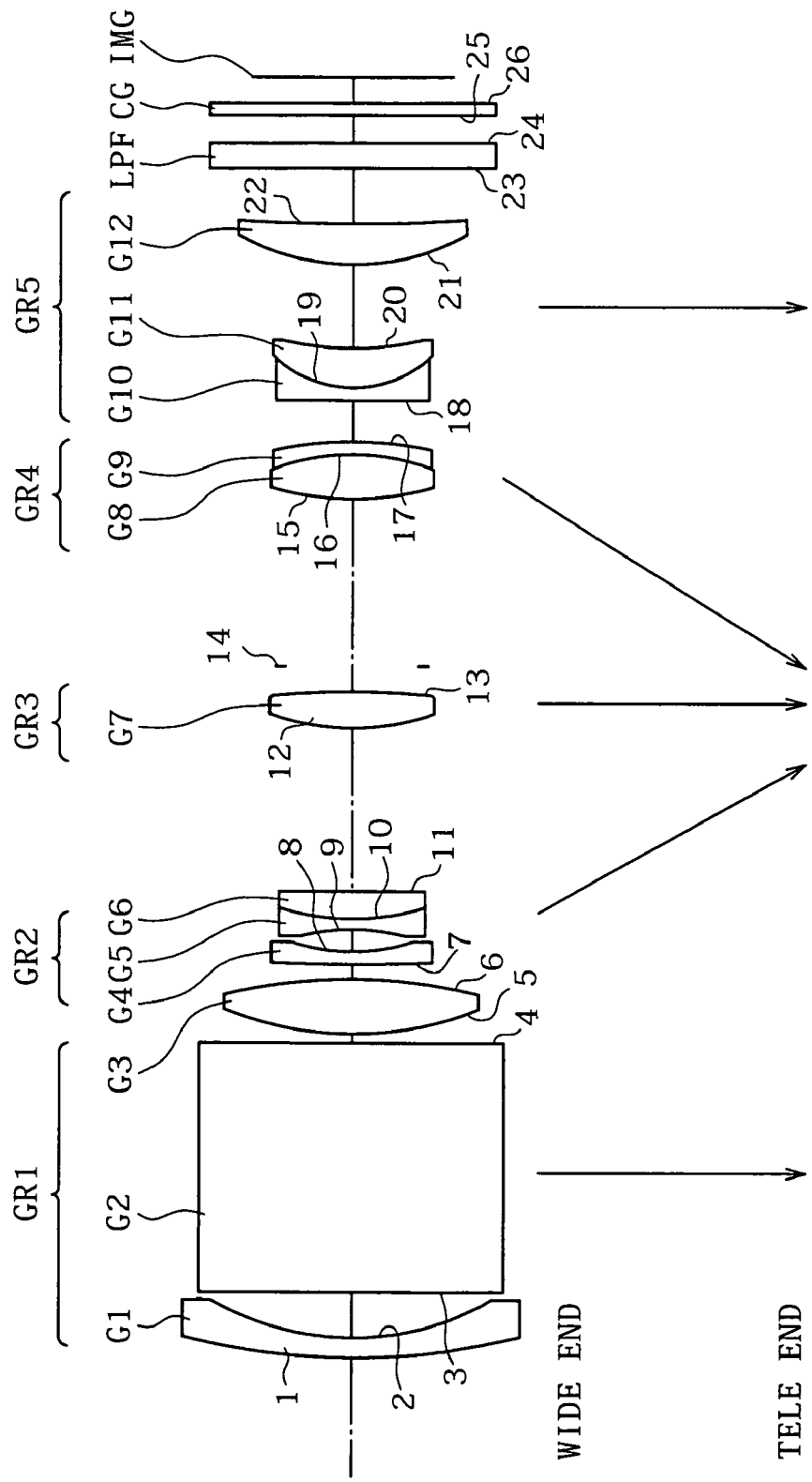

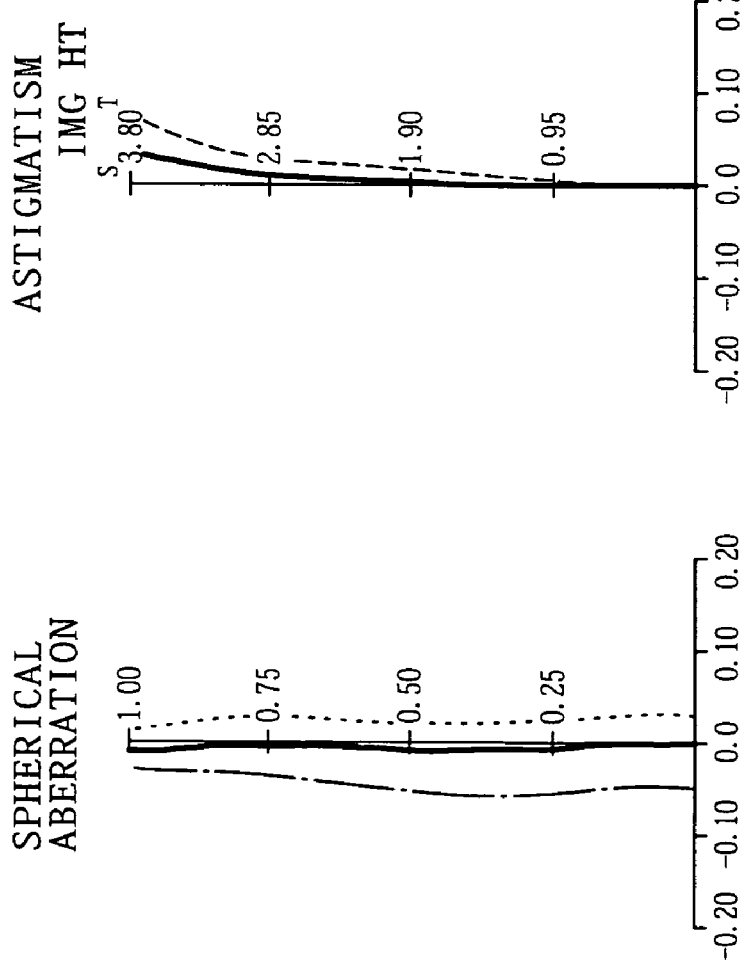
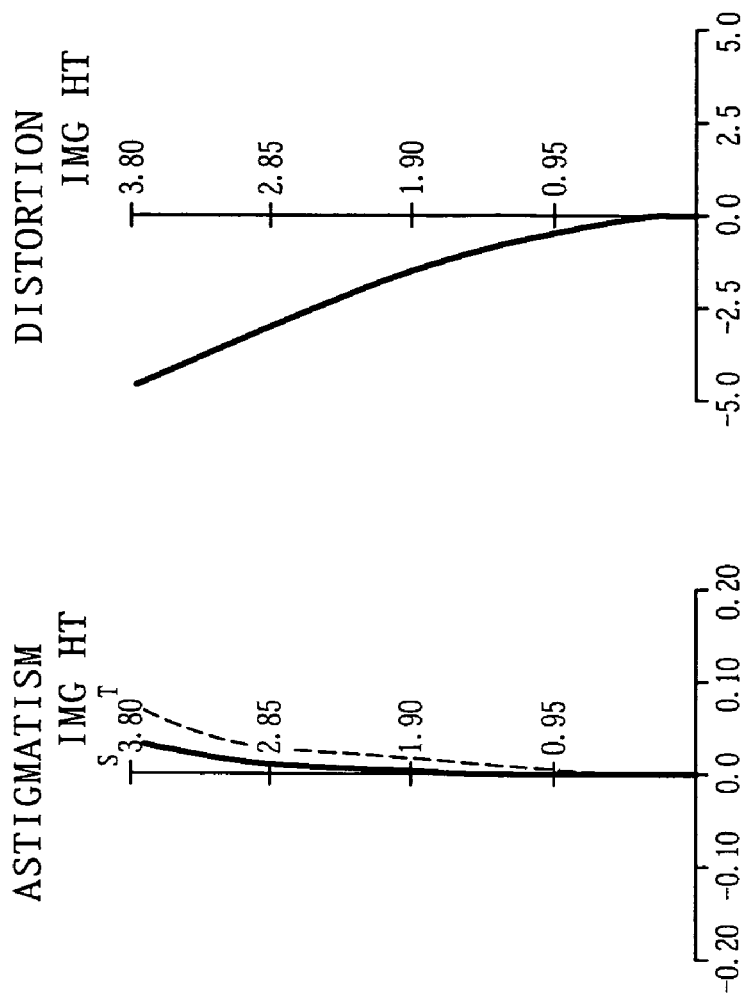
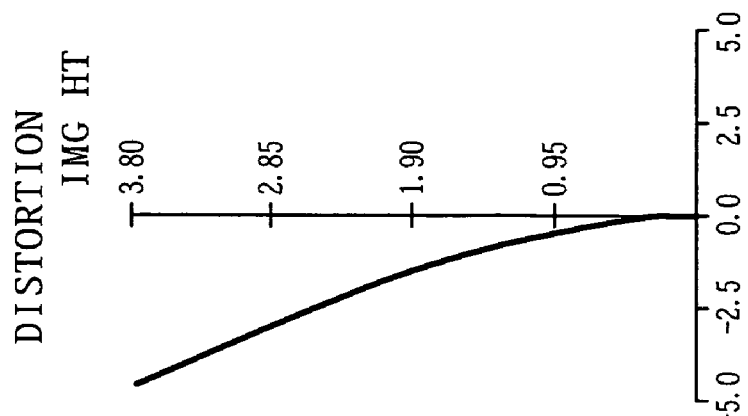

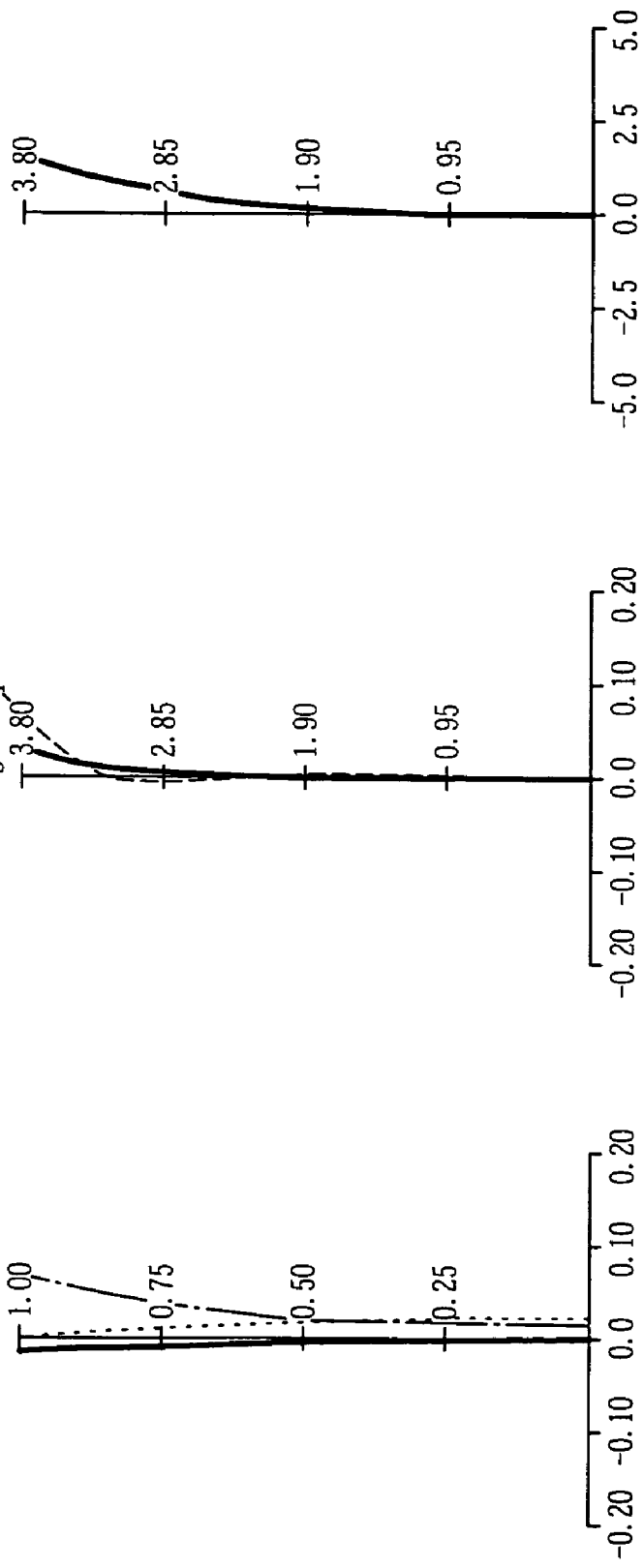

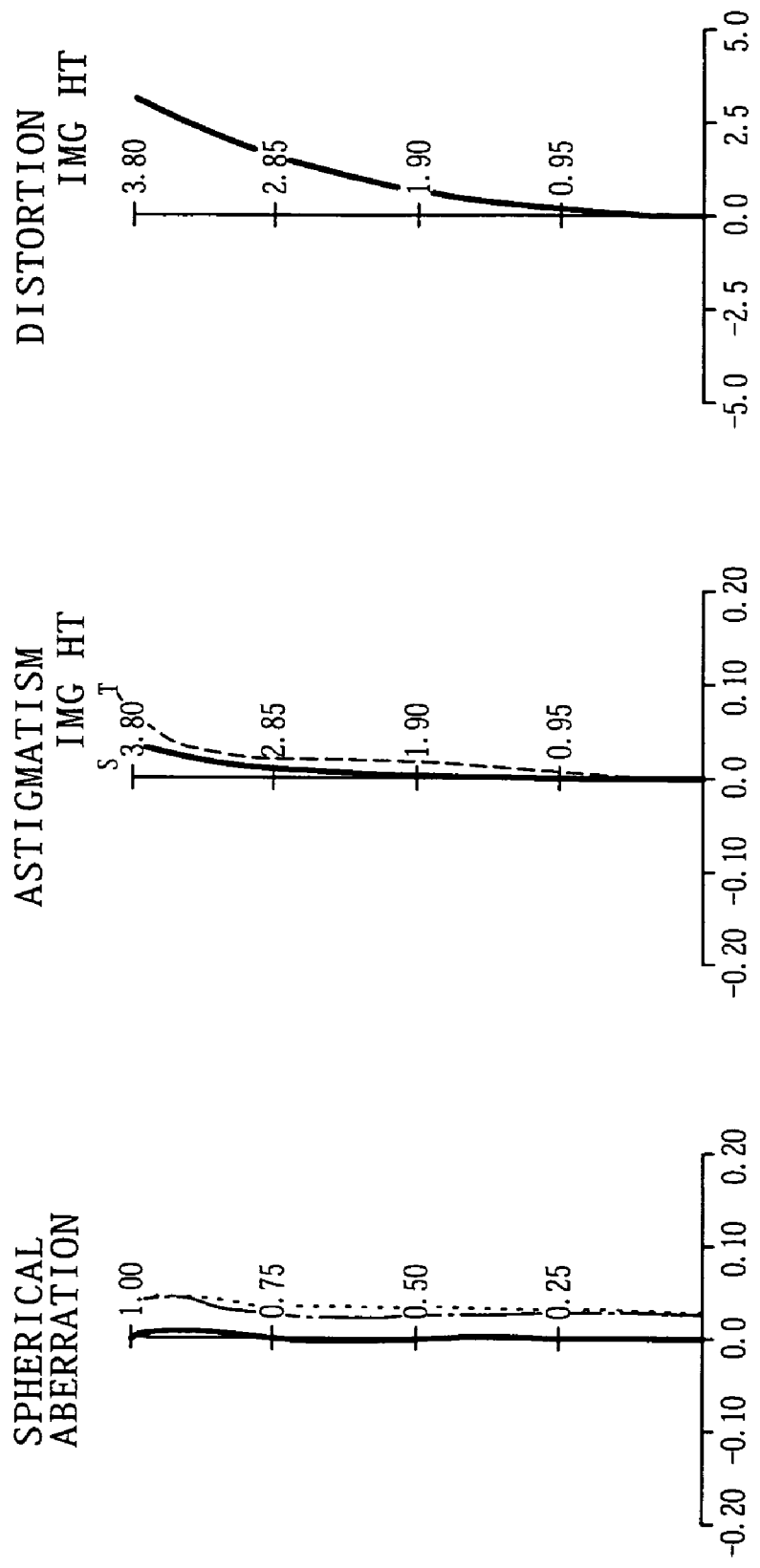

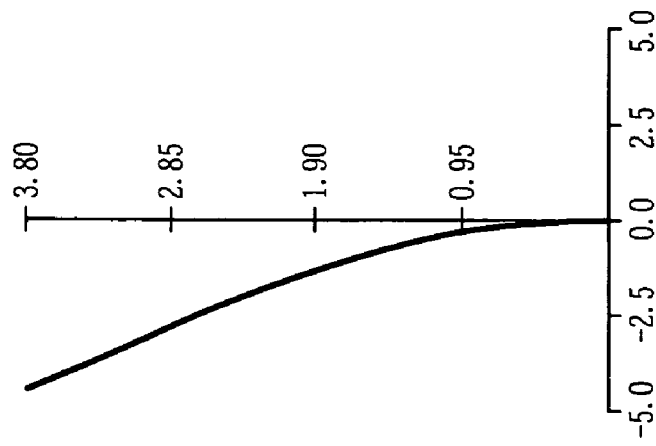

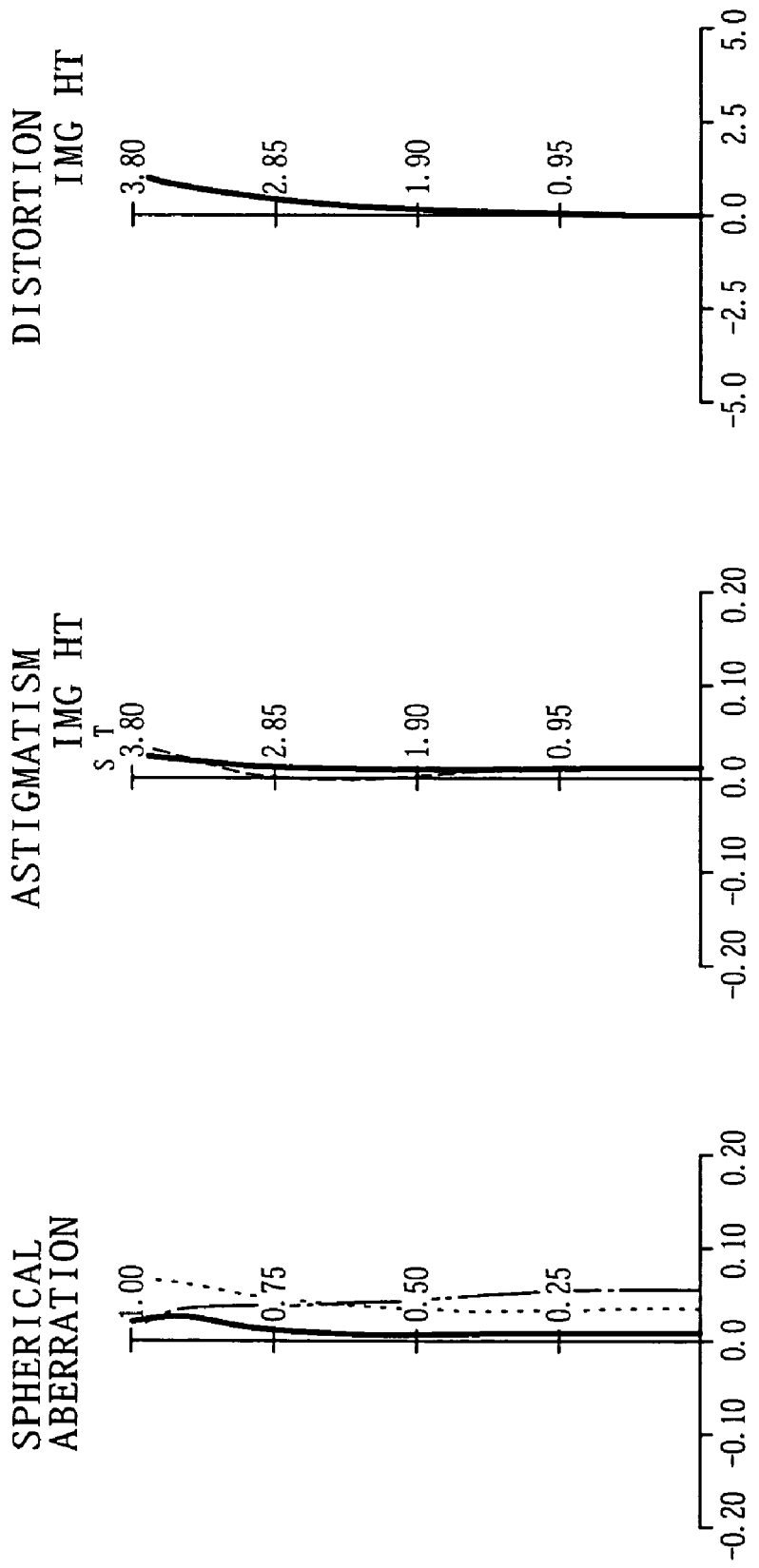

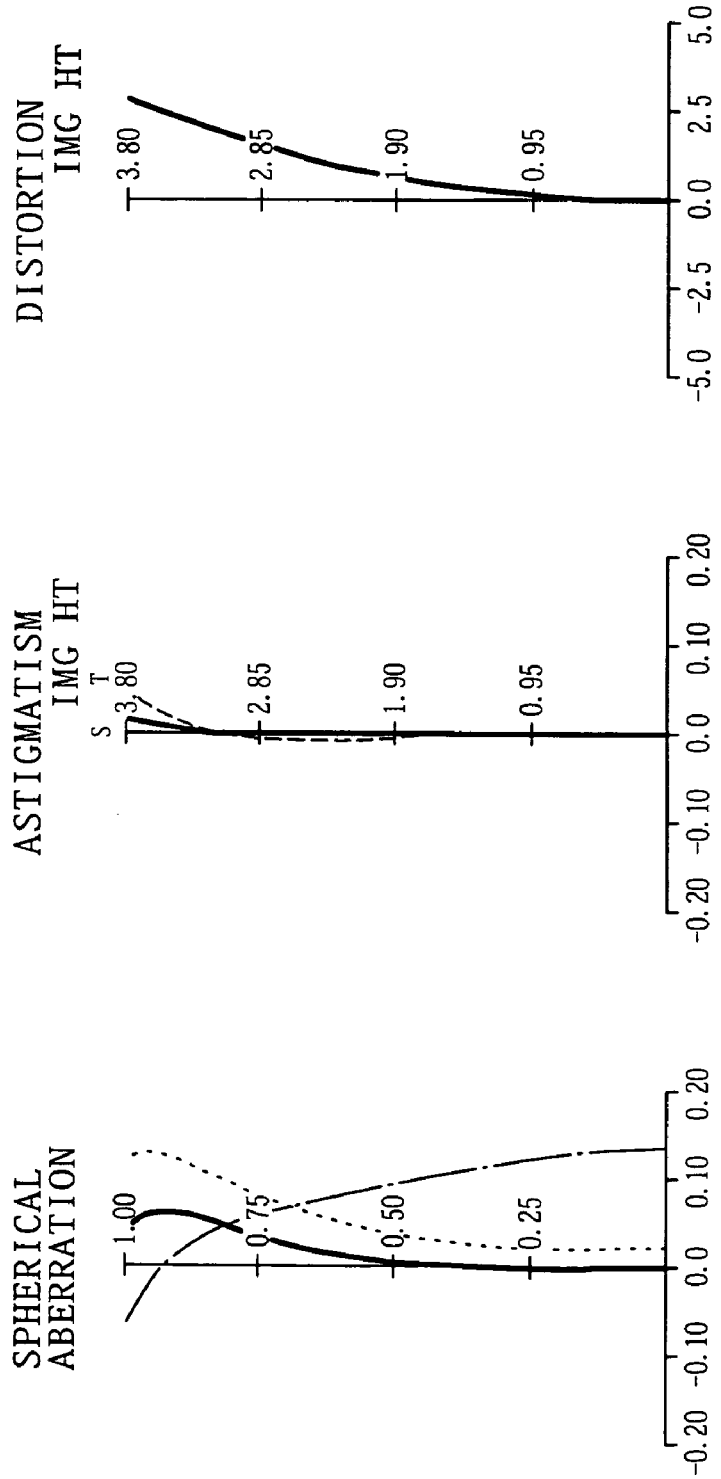

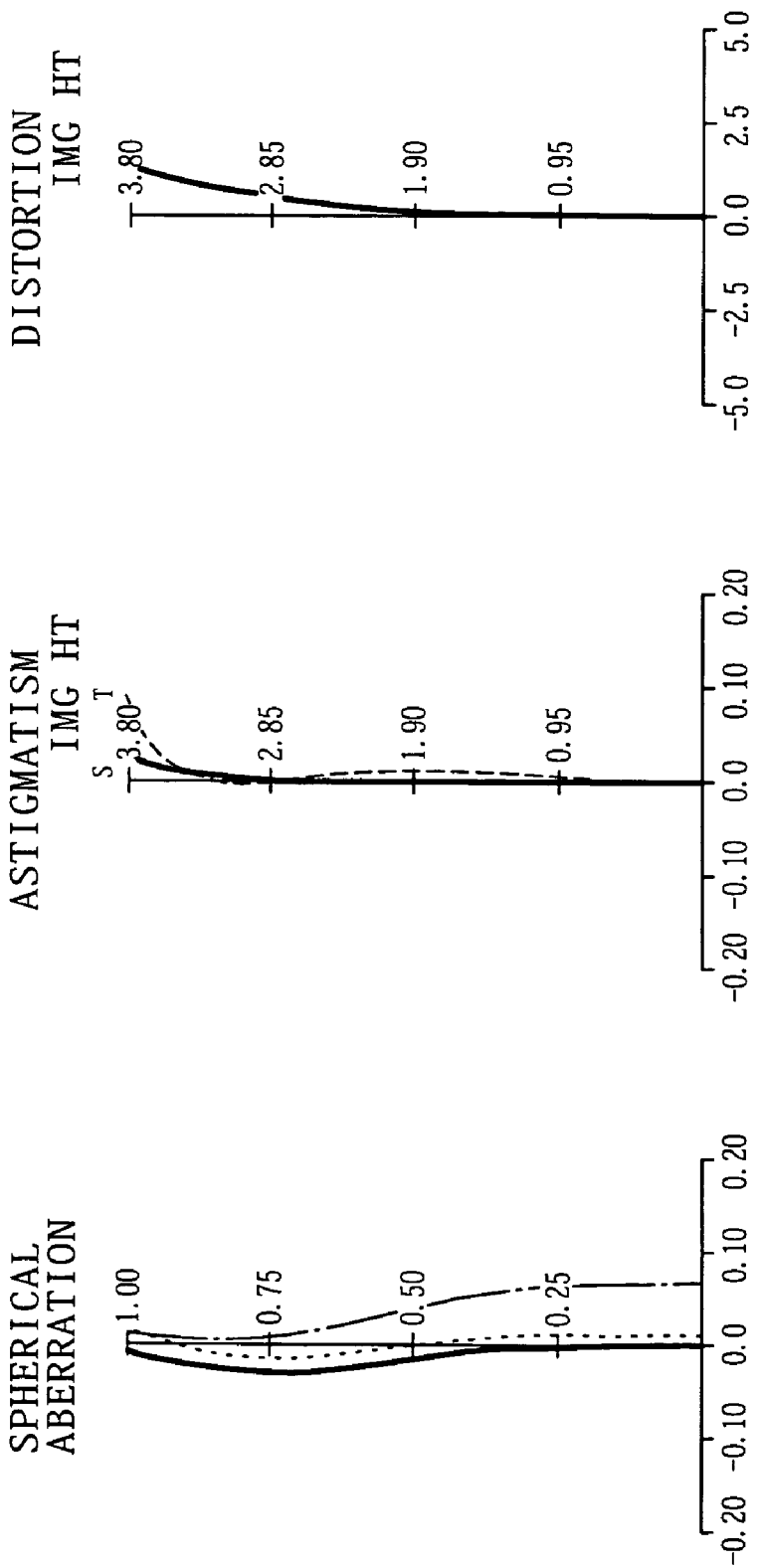

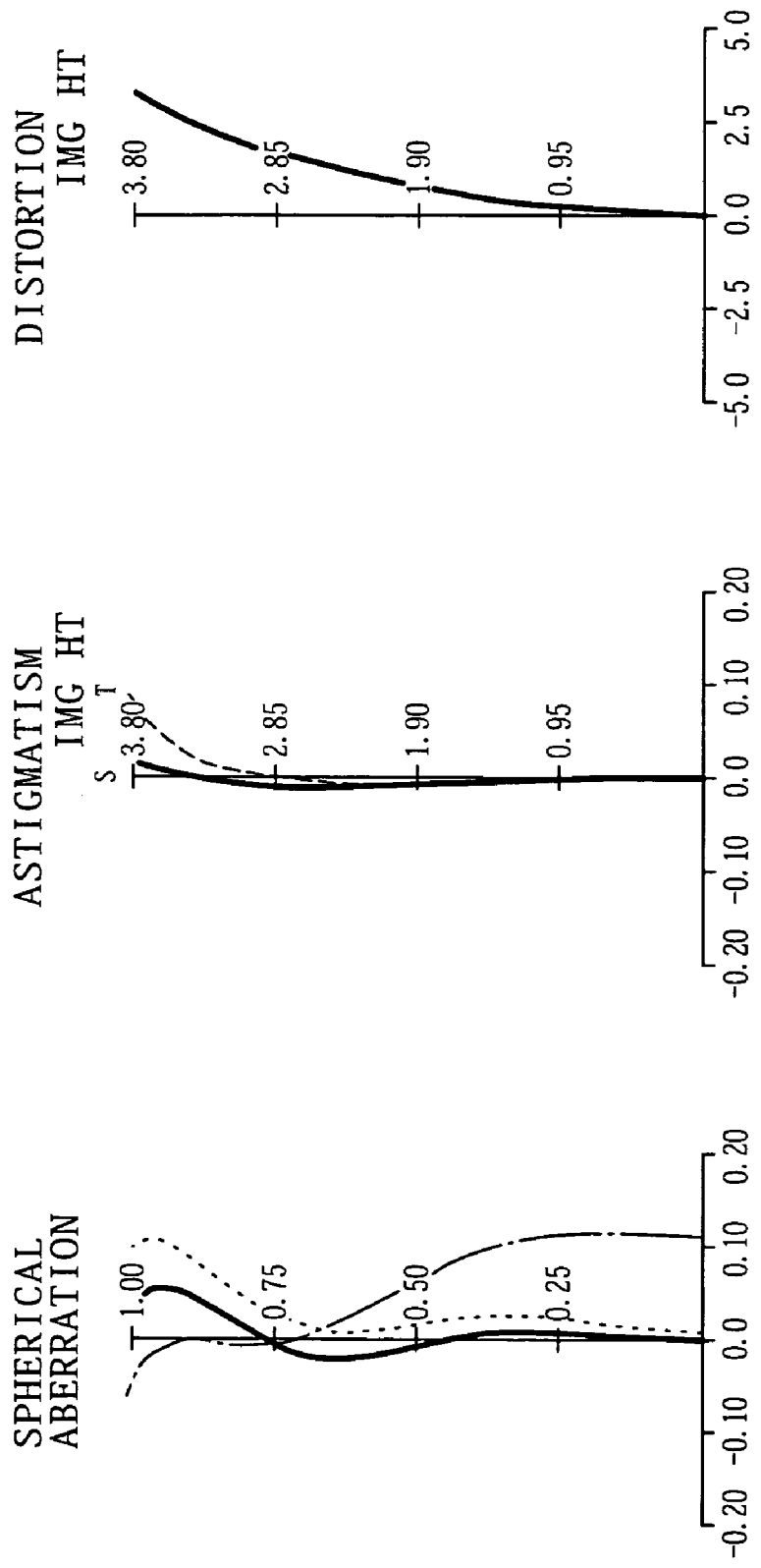

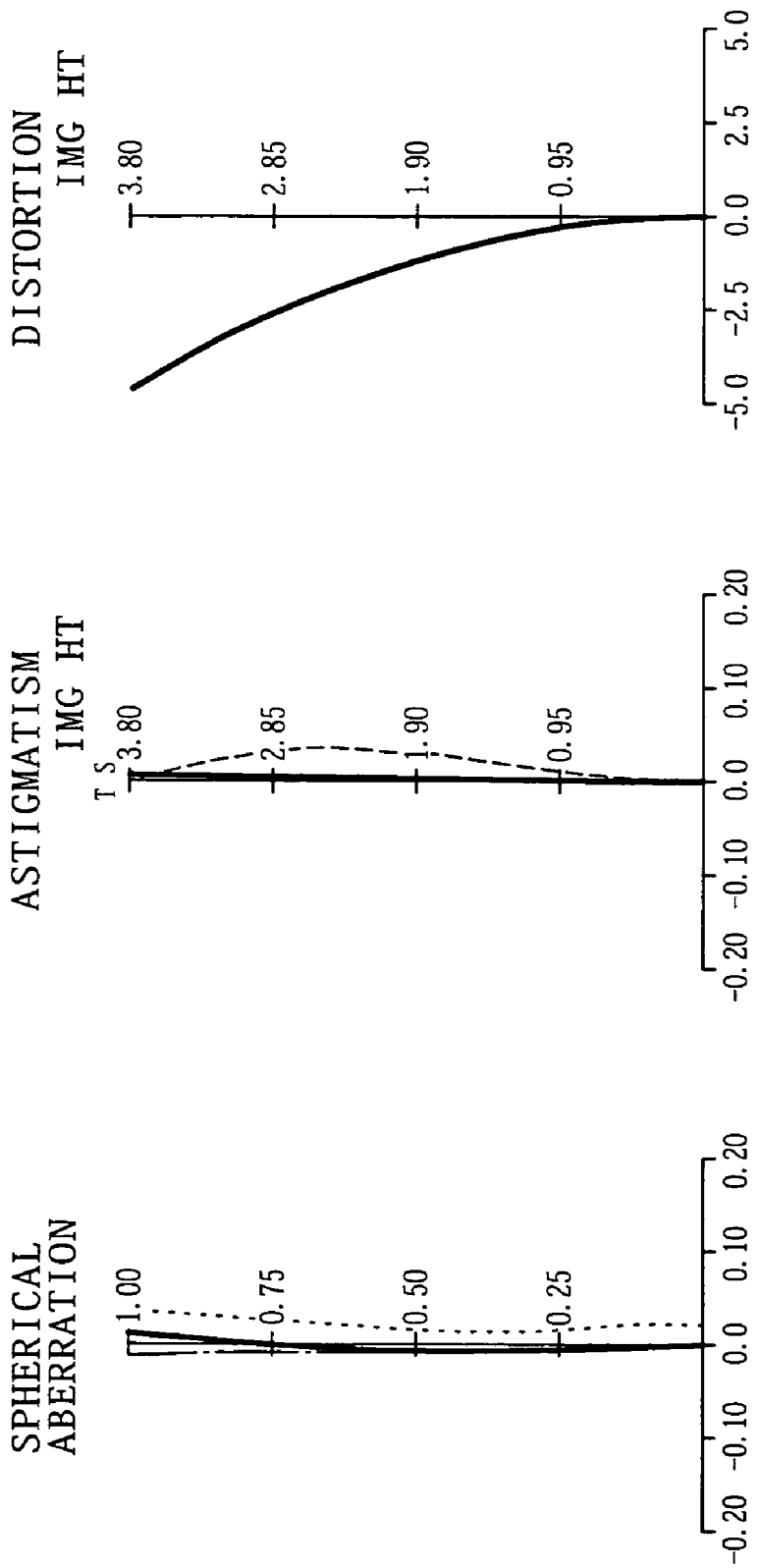

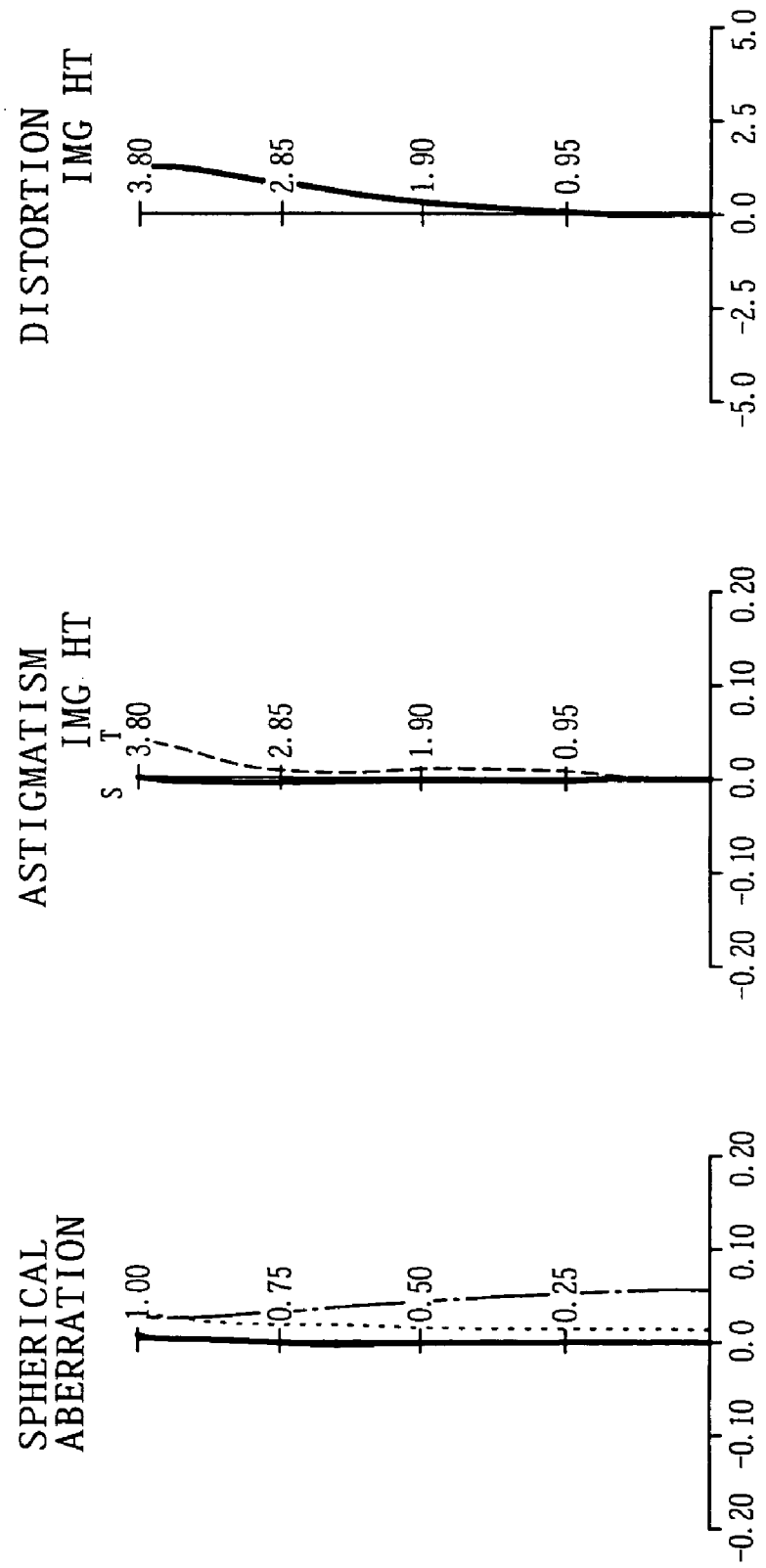

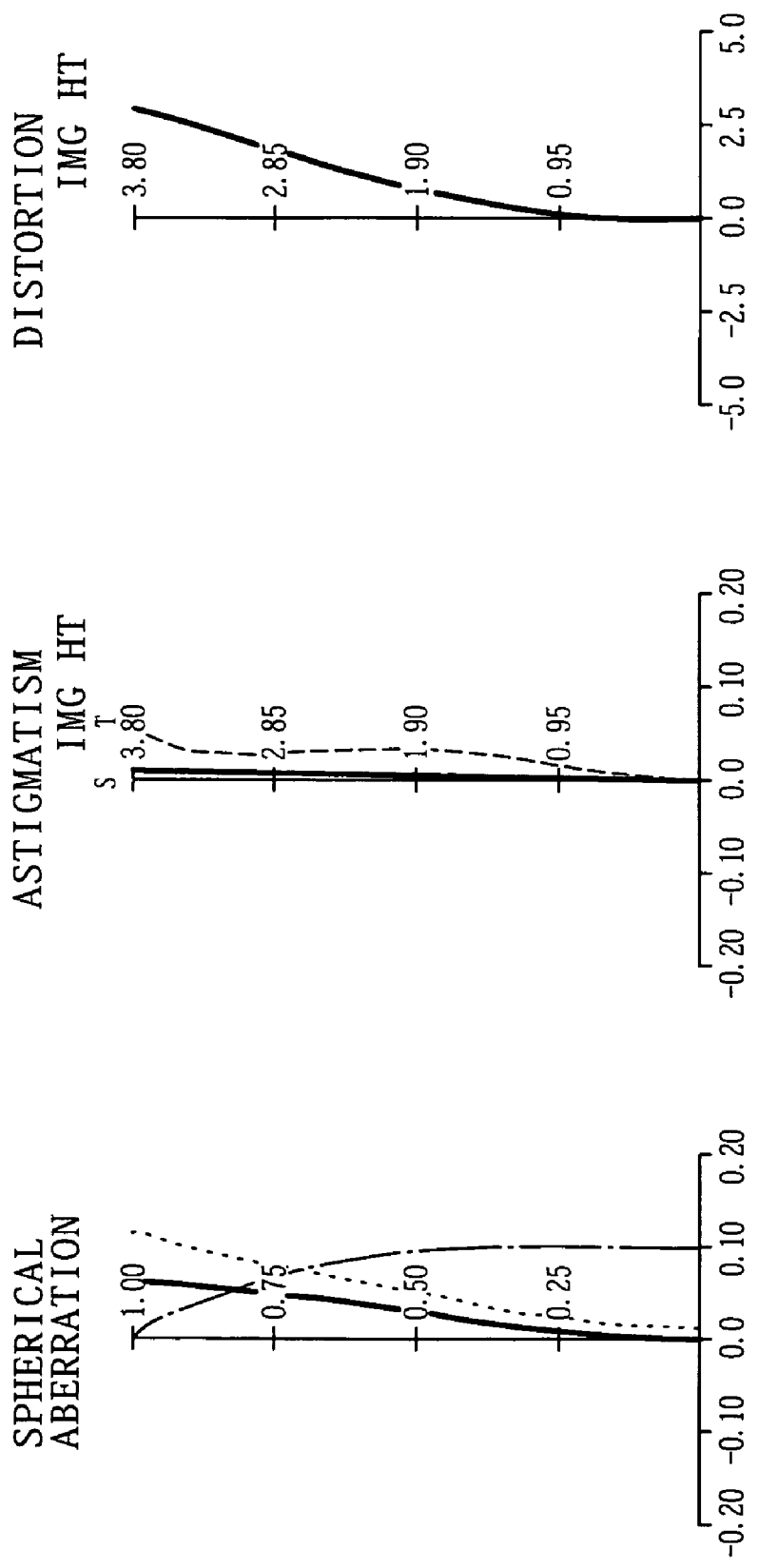

ZOOM LENS AND IMAGING DEVICE

TECHNICAL FIELD

The present invention relates to a zoom lens and an imaging device equipped therewith, said zoom lens being suitable for the imaging optical system of digital input and output devices such as digital still cameras and digital video cameras on account of its compact size and variable power.

BACKGROUND ART

Recent years have witnessed the wide diffusion of the imaging devices, such as digital still cameras, which are equipped with a solid-state imaging element. Digital still cameras are required to have an improved image quality as they become popular more than before. Particularly, those digital still cameras equipped with a solid-state imaging element having a large number of pixels need an imaging lens, especially a zoom lens, with good image-forming performance. They are also required to be small in size, and hence there is a strong demand for a small-size high-performance zoom lens. (See Japanese Patent No. 2750775 [Patent document 1]) On the other hand, attempts are being made to reduce the size of the zoom lens in the direction of an optical axis by bending the optical system with a prism inserted between lenses. (See Japanese Patent Laid-open No. 248318-1996 [Patent document 2])

Insertion of a prism is a very effective way to reduce the lens diameter and length (or to reduce the overall lens size) for the optical system having the positive refracting power at the object side and the negative refracting power at the image side, in the case of conventional lens-shutter cameras for silver salt film. Unfortunately, it does not permit microlenses to fully exhibit their condensing performance because microlenses have the exit pupil near the image surface and are arranged in front of the solid-state imaging element. The problem is that the image brightness extremely varies in going from the image center to the image edge.

The object of miniaturization is not fully achieved in the optical system equipped with a solid-state imaging element (which is disclosed in the patent document 1), because the optical system employs a negative lens group as the last lens group which is limited in power. The object of miniaturization is not fully achieved either in the optical system disclosed in the patent document 2, which is designed to reduce the size in the direction of the optical axis by bending the optical axis with a prism inserted in the positive-negative-positive-positive zoom type, because the optical system employs a front lens and a reflecting member which are large in size.

DISCLOSURE OF THE INVENTION

The present invention was completed to address the above-mentioned problems. Thus, the present invention is directed to a zoom lens and an imaging device equipped therewith. The zoom lens is composed of a plurality of lens groups arranged at variable intervals and hence is capable of power variation. Moreover, it contains a reflecting member to bend the optical axis, and its lens groups are characterized in that the last lens group (counted from the object side) consists of a negative lens group and a positive lens group, with an air layer interposed between them, which are sequentially arranged from the object side.

In addition, the present invention is directed to a zoom lens and an imaging device equipped therewith. The zoom lens is composed of a plurality of lens groups arranged at variable intervals and hence is capable of power variation. Moreover, it has the lens groups which are characterized in that the last lens group (counted from the object side) has a negative refracting power and consists of a negative lens group and a positive lens group, with an air layer interposed between them, which are sequentially arranged from the object side.

The advantage of the present invention is that the entire lens system can be miniaturized and the position of entrance pupil can be placed away from the image plane. This leads to size reduction and thickness reduction for the zoom lens and the imaging device equipped therewith.

BRIEF DESCRIPTION OF THE DRAWINGS

FIG. 4 is a diagram showing the lens arrangement of the zoom lens in the fourth example, which is adjusted to the end position of the short focal length.

FIGS. 5A to 5C are diagrams showing the aberrations which the zoom lens in the first example experiences when adjusted to the end position of the short focal length.

FIGS. 6A to 6C are diagrams showing the aberrations which the zoom lens in the first example experiences when adjusted to a position of the intermediate focal length.

FIGS. 7A to 7C are diagrams showing the aberrations which the zoom lens in the first example experiences when adjusted to the end position of the long focal length.

FIGS. 8A to 8C are diagrams showing the aberrations which the zoom lens in the second example experiences when adjusted to the end position of the short focal length.

FIGS. 9A to 9C are diagrams showing the aberrations which the zoom lens in the second example experiences when adjusted to a position of the intermediate focal length.

FIGS. 10A to 10C are diagrams showing the aberrations which the zoom lens in the second example experiences when adjusted to the end position of the long focal length.

FIGS. 12A to 12C are diagrams showing the aberrations which the zoom lens in the third example experiences when adjusted to a position of the intermediate focal length.

FIGS. 13A to 13C are diagrams showing the aberrations which the zoom lens in the third example experiences when adjusted to the end position of the long focal length.

FIGS. 14A to 14C are diagrams showing the aberrations which the zoom lens in the fourth example experiences when adjusted to the end position of the short focal length.

FIGS. 15A to 15C are diagrams showing the aberrations which the zoom lens in the fourth example experiences when adjusted to a position of the intermediate focal length.

FIGS. 16A to 16C are diagrams showing the aberrations which the zoom lens in the fourth example experiences when adjusted to the end position of the long focal length.

BEST MODE FOR CARRYING OUT THE INVENTION

The invention will be described in more detail with reference to its preferred embodiments. The zoom lens demonstrated in the embodiments is a compact one intended for use with imaging devices such as video cameras and digital still cameras. The present invention covers a zoom lens of the type having a plurality of lens groups and varying in power in response to variation in intervals between the lens groups, which comprises a reflecting member to bend the optical axis passing through the lens groups and a last lens group (counted from the object side) which is composed of a negative lens group and a positive lens group, with an air layer interposed between them (arranged sequentially from the object side). The present invention also covers an imaging device equipped with an imaging element which converts the optical image formed by the zoom lens into electrical signals.

In the zoom lens according to the present embodiment, the lens groups should preferably be constructed such that the first lens group (counted from the object side) is stationary and contains said reflecting member. Moreover, in the zoom lens according to the present embodiment, the lens groups should preferably be constructed such that the last lens group (counted from the object side) has a negative refracting power.

In the zoom lens according to the present embodiment, the negative lens group of the last lens group should preferably satisfy the condition defined by the inequality (1) below.

$$0.9 < |fa/fw| < 1.25$$

where, fa denotes the focal length of the negative lens group in the last lens group, and fw denotes the focal length at its wide end.

The inequality (1) given above defines the focal length of the negative lens group in the last lens group. If the focal length is smaller than the lower limit of the inequality (1), then it would be difficult to correct the edge coma and the chromatic aberration of magnification. If the focal length is larger than the upper limit of the inequality (1), then the negative lens group has a weak power which prevents miniaturization.

The zoom lens according to the present invention may be composed of a plurality of lens groups alone, with the above-mentioned reflecting member omitted. Incidentally, in the case where a prism is used as the reflecting member to bend the optical axis, it is desirable to select one which is made of glass with a high refractive index.

EXAMPLES

Figure 1:
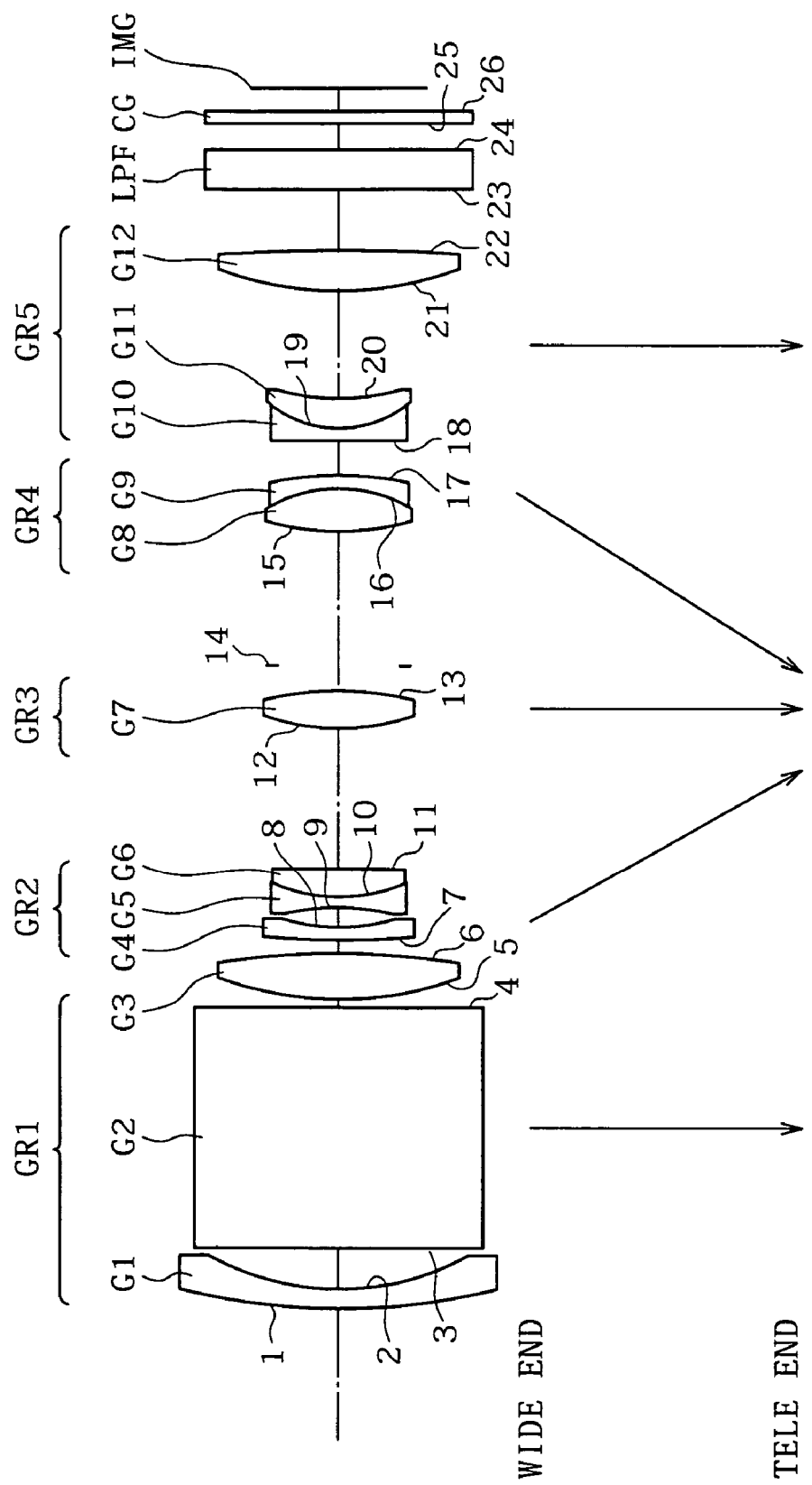
FIG. 1 is a diagram showing the lens arrangement of the zoom lens in the first example, which is adjusted to the end position of the short focal length.

A description is given below of the examples of the present invention. FIG. 1 is a diagram showing the lens arrangement of the zoom lens in the first example. The arrows in the figure represent the loci along which the lens groups move in going from the wide end position to the tele end position. The zoom lens in the first example consists of a first lens group GR1 (positive), a second lens group GR2 (negative), a third lens group GR3 (positive), a fourth lens group GR4 (positive), and a fifth lens group GR5 (negative), which are arranged sequentially from the object side. The first lens group GR1 consists of a negative lens G1, a rectangular prism G2 to bend the optical axis through 90°, and a positive lens G3 having aspherical surfaces on both sides.

The second lens group GR2 consists of a negative lens G4, a negative lens G5, and a positive lens G6, which are cemented together. The third lens group GR3 is a positive lens G7 having aspherical surfaces on both sides. The fourth lens group GR4 consists of a positive lens G8 having an aspherical surface at the object side and a negative lens G9, which are cemented together. The fifth lens group GR5 consists of a negative lens G10 and a positive lens G11, which are cemented together, and a positive lens G12. Incidentally, "LPF" denotes a filter, "CG" denotes a cover glass, and "IMG" denotes the receiving surface of the imaging element.

Figure 2:
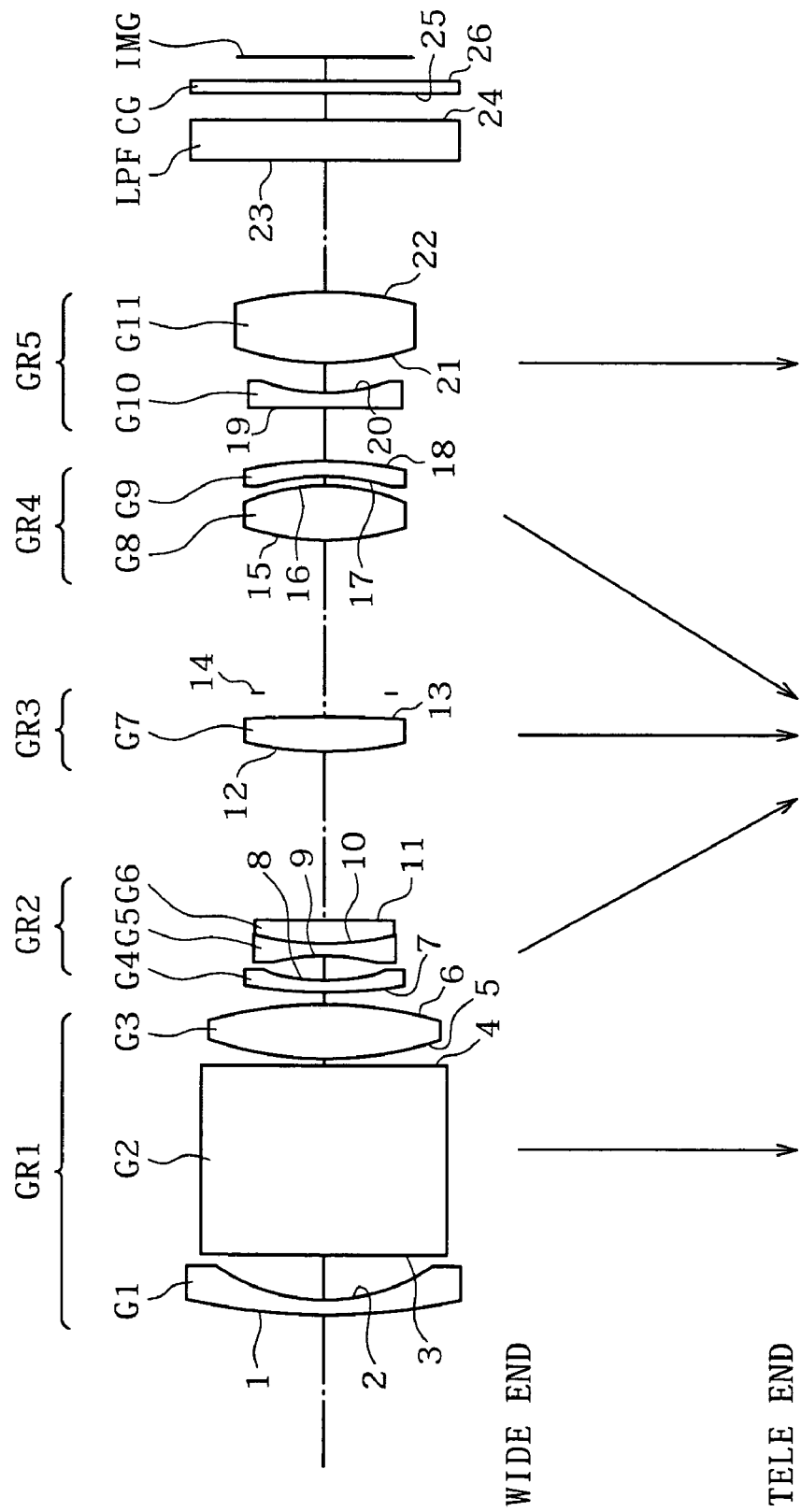
FIG. 2 is a diagram showing the lens arrangement of the zoom lens in the second example, which is adjusted to the end position of the short focal length.

FIG. 2 is a diagram showing the lens arrangement of the zoom lens in the second example. The arrows in the figure represent the loci along which the lens groups move in going from the wide end position to the tele end position. The zoom lens in the second example consists of a first lens group GR1 (positive), a second lens group GR2 (negative), a third lens group GR3 (positive), a fourth lens group GR4 (positive), and a fifth lens group GR5 (negative), which are arranged sequentially from the object side. The first lens group GR1 consists of a negative lens G1, a rectangular prism G2 to bend the optical axis through 90°, and a positive lens G3 having aspherical surfaces on both sides.

The second lens group GR2 consists of a negative lens G4, a negative lens G5, and a positive lens G6, which are cemented together. The third lens group GR3 is a positive lens G7 having aspherical surfaces on both sides. The fourth lens group GR4 consists of a positive lens G8 having aspherical surfaces on both sides and a negative lens G9. The fifth lens group G5 consists of a negative lens G10 and a positive lens G11. Incidentally, "LPF" denotes a filter, "CG" denotes a cover glass, and "IMG" denotes the receiving surface of the imaging element.

Figure 3:
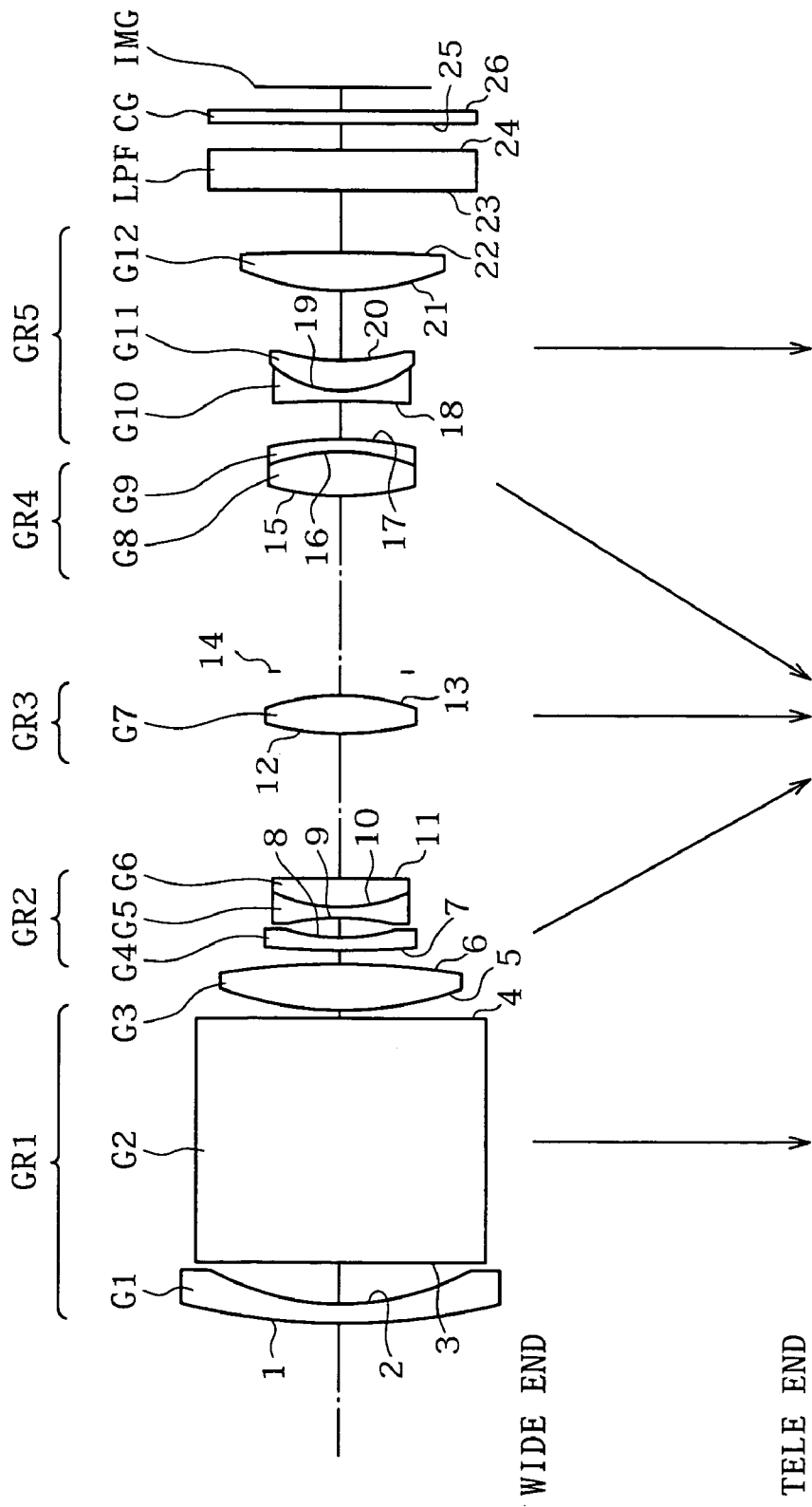
FIG. 3 is a diagram showing the lens arrangement of the zoom lens in the third example, which is adjusted to the end position of the short focal length.

FIG. 3 is a diagram showing the lens arrangement of the zoom lens in the third example. The arrows in the figure represent the loci along which the lens groups move in going from the wide end position to the tele end position. The zoom lens in the third example consists of a first lens group GR1 (positive), a second lens group GR2 (negative), a third lens group GR3 (positive), a fourth lens group GR4 (positive), and a fifth lens group GR5 (negative), which are arranged sequentially from the object side. The first lens group GR1 consists of a negative lens G1, a rectangular prism G2 to bend the optical axis through 90°, and a positive lens G3 having aspherical surfaces on both sides.

The second lens group GR2 consists of a negative lens G4, a negative lens G5, and a positive lens G6, which are cemented together. The third lens group GR3 is a positive lens G7 having aspherical surfaces on both sides. The fourth lens group GR4 consists of a positive lens G8 having an aspherical surface at the object side and a negative lens G9, which are cemented together. The fifth lens group GR5 consists of a negative lens G10 and a positive lens G11, which are cemented together, and a positive lens G12. Incidentally, "LPF" denotes a filter, "CG" denotes a cover glass, and "IMG" denotes the receiving surface of the imaging element.

FIG. 4 is a diagram showing the lens arrangement of the zoom lens in the fourth example. The arrows in the figure represent the loci along which the lens groups move in going from the wide end position to the tele end position. The zoom lens in the fourth example consists of a first lens group GR1 (positive), a second lens group GR2 (negative), a third lens group GR3 (positive), a fourth lens group GR4 (positive), and a fifth lens group GR5 (negative), which are arranged sequentially from the object side. The first lens group GR1 consists of a negative lens G1, a rectangular prism G2 to bend the optical axis through 90°, and a positive lens G3 having aspherical surfaces on both sides.

The second lens group GR2 consists of a negative lens G4, a negative lens G5, and a positive lens G6, which are cemented together. The third lens group GR3 is a positive lens G7 having aspherical surfaces on both sides. The fourth lens group GR4 consists of a positive lens G8 having an aspherical surface at the object side and a negative lens G9, which are cemented together. The fifth lens group GR5 consists of a negative lens G10 and a positive lens G11, which are cemented together, and a positive lens G12 having an aspherical surface at the object side. Incidentally, "LPF" denotes a filter, "CG" denotes a cover glass, and "IMG" denotes the receiving surface of the imaging element.

Tables 1 to 4 below show the specifications of the zoom lenses in Examples 1 to 4.

TABLE 1

FNo. = 3.60~3.82~4.33
f = 6.88~11.75~20.13
ω = 30.15~17.69~10.41

| Surface No. | R | d | nd | νd |
|---|---|---|---|---|
| 1: | 24.314 | 0.650 | 1.92286 | 20.884 |
| 2: | 11.460 | 1.706 | | |
| 3: | INFINITY | 10.400 | 1.84666 | 23.785 |
| 4: | INFINITY | 0.300 | | |
| 5: | 13.444 (ASP) | 2.041 | 1.76802 | 49.300 |
| 6: | −32.214 (ASP) | 0.600~3.953~6.348 | | |
| 7: | 45.683 | 0.500 | 1.83500 | 42.984 |
| 8: | 6.670 | 0.962 | | |
| 9: | −8.756 | 0.450 | 1.83500 | 42.984 |
| 10: | 8.338 | 1.100 | 1.92286 | 20.884 |
| 11: | 77.391 | 6.248~2.894~0.500 | | |
| 12: | 13.396 (ASP) | 1.342 | 1.80611 | 40.734 |
| 13: | −22.669 (ASP) | 1.000 | | |
| 14: | Diaphragm | 6.143~4.137~2.002 | | |
| 15: | 9.726 (ASP) | 2.058 | 1.58313 | 59.460 |
| 16: | −6.016 | 0.550 | 1.84666 | 23.785 |
| 17: | −10.574 | 1.500~3.506~5.641 | | |
| 18: | −3257.375 | 0.500 | 1.84666 | 23.785 |
| 19: | 4.886 | 1.200 | 1.49700 | 81.608 |
| 20: | 7.983 | 4.929 | | |
| 21: | 12.428 | 1.710 | 1.84666 | 23.785 |
| 22: | −102.038 | 2.200 | | |
| 23: | INFINITY | 1.700 | 1.51680 | 64.198 |
| 24: | INFINITY | 1.120 | | |
| 25: | INFINITY | 0.500 | 1.51680 | 64.198 |
| 26: | INFINITY | | | |

| Surface No. | ε | $A^4$ | $A^6$ | $A^8$ | $A^{10}$ |
|---|---|---|---|---|---|
| 5 | 1 | −0.840224E−04 | 0.108789E−05 | −0.274452E−07 | −0.276900E−08 |
| 6 | 1 | −0.411280E−04 | 0.235427E−05 | −0.102904E−06 | −0.104317E−08 |
| 12 | 1 | −0.102097E−03 | −0.939322E−05 | 0.172600E−05 | −0.985871E−07 |
| 13 | 1 | 0.410092E−04 | 0.430239E−05 | −0.207652E−06 | −0.229518E−09 |
| 15 | 1 | −0.353645E−03 | 0.199877E−04 | −0.290779E−05 | 0.160608E−06 |

TABLE 2

FNo. = 3.60~3.91~4.56
f = 6.91~11.60~19.52
ω = 29.96~17.97~10.74

| Surface No. | R | d | nd | νd |
|---|---|---|---|---|
| 1: | 25.369 | 0.650 | 1.92286 | 20.884 |
| 2: | 8.327 | 1.780 | | |
| 3: | INFINITY | 8.000 | 1.83500 | 42.984 |
| 4: | INFINITY | 0.300 | | |
| 5: | 15.439 (ASP) | 2.224 | 1.76802 | 49.300 |
| 6: | −19.755 (ASP) | 0.500~4.375~7.141 | | |
| 7: | 17.289 | 0.500 | 1.83500 | 42.984 |
| 8: | 7.267 | 1.092 | | |
| 9: | −9.657 | 0.450 | 1.80420 | 46.503 |
| 10: | 11.003 | 1.100 | 1.92286 | 20.884 |
| 11: | 58.748 | 7.180~3.305~0.539 | | |
| 12: | 15.059 (ASP) | 1.450 | 1.80611 | 40.734 |
| 13: | −55.971 (ASP) | 1.000 | | |
| 14: | Diaphragm | 6.607~4.519~2.049 | | |
| 15: | 10.414 (ASP) | 2.200 | 1.58313 | 59.460 |

TABLE 2-continued

| Surface No. | R | d | nd | νd |
|---|---|---|---|---|
| 16: | −8.132 (ASP) | 0.383 | | |
| 17: | −8.821 | 0.550 | 1.84666 | 23.785 |
| 18: | −16.182 | 2.324~4.412~6.892 | | |
| 19: | −109.259 | 0.580 | 1.84666 | 23.785 |
| 20: | 7.004 | 1.300 | | |
| 21: | 11.199 | 3.000 | 1.48749 | 70.441 |
| 22: | −14.147 | 5.500 | | |
| 23: | INFINITY | 1.700 | 1.51680 | 64.198 |
| 24: | INFINITY | 1.120 | | |
| 25: | INFINITY | 0.500 | 1.51680 | 64.198 |
| 26: | INFINITY | | | |

| Surface No. | ε | $A^4$ | $A^6$ | $A^8$ | $A^{10}$ |
|---|---|---|---|---|---|
| 5 | 1 | −0.927469E−04 | 0.261903E−05 | −0.132821E−06 | 0.309627E−08 |
| 6 | 1 | −0.675780E−04 | 0.360001E−05 | −0.178921E−06 | 0.415484E−08 |
| 12 | 1 | −0.621787E−05 | 0.998207E−05 | −0.792395E−06 | 0.440588E−07 |
| 13 | 1 | 0.124983E−03 | 0.925746E−05 | −0.600970E−06 | 0.377290E−07 |
| 15 | 1 | −0.223643E−03 | −0.514160E−05 | −0.521675E−06 | −0.135921E−06 |
| 16 | 1 | 0.129992E−03 | 0.119792E−05 | −0.172572E−05 | −0.531183E−07 |

TABLE 3

FNo. = 3.60~3.80~4.36
f = 6.88~11.76~19.78
ω = 30.17~17.74~10.58

| Surface No. | R | d | nd | νd |
|---|---|---|---|---|
| 1: | 29.596 | 0.800 | 1.92286 | 20.884 |
| 2: | 11.833 | 1.550 | | |
| 3: | INFINITY | 10.340 | 1.84666 | 23.785 |
| 4: | INFINITY | 0.300 | | |
| 5: | 13.176 (ASP) | 2.001 | 1.76802 | 49.300 |
| 6: | −32.361 (ASP) | 0.600~4.048~6.307 | | |
| 7: | 39.783 | 0.500 | 1.83500 | 42.984 |
| 8: | 7.129 | 0.891 | | |
| 9: | −9.370 | 0.450 | 1.83500 | 42.984 |
| 10: | 6.699 | 1.135 | 1.92286 | 20.884 |
| 11: | 29.165 | 6.207~2.759~0.500 | | |
| 12: | 11.505 (ASP) | 1.555 | 1.58313 | 59.460 |
| 13: | −10.840 (ASP) | 1.000 | | |
| 14: | Diaphragm | 7.415~4.719~2.048 | | |
| 15: | 10.125 (ASP) | 1.881 | 1.58313 | 59.460 |
| 16: | −8.255 | 0.540 | 1.84666 | 23.785 |
| 17: | −14.464 | 1.513~4.209~6.880 | | |
| 18: | −103.537 | 0.500 | 1.84666 | 23.785 |
| 19: | 4.674 | 1.253 | 1.48749 | 70.441 |
| 20: | 8.681 | 2.908 | | |
| 21: | 11.886 | 1.597 | 1.84666 | 23.785 |
| 22: | −76.923 | 2.553 | | |
| 23: | INFINITY | 1.700 | 1.51680 | 64.198 |
| 24: | INFINITY | 1.120 | | |
| 25: | INFINITY | 0.500 | 1.51680 | 64.198 |
| 26: | INFINITY | | | |

| Surface No. | ε | $A^4$ | $A^6$ | $A^8$ | $A^{10}$ |
|---|---|---|---|---|---|
| 5 | 1 | −0.113945E−03 | 0.180324E−05 | 0.387819E−07 | −0.501495E−08 |
| 6 | 1 | −0.747724E−04 | 0.483239E−05 | −0.123687E−06 | −0.191289E−08 |
| 12 | 1 | −0.624370E−03 | −0.916356E−04 | 0.895972E−05 | −0.104621E−05 |
| 13 | 1 | −0.267344E−03 | −0.588310E−04 | 0.421433E−05 | −0.697018E−06 |
| 15 | 1 | −0.319893E−03 | 0.408341E−04 | −0.678945E−05 | 0.378621E−06 |

TABLE 4

FNo. = 3.60~3.81~4.25
f = 6.83~11.68~19.54
ω = 30.24~17.80~10.72

| Surface No. | R | d | nd | νd |
|---|---|---|---|---|
| 1: | 26.824 | 0.800 | 1.92286 | 20.884 |
| 2: | 10.610 | 1.692 | | |

TABLE 4-continued

| | | | | |
|---|---|---|---|---|
| 3: | INFINITY | 10.040 | 1.83500 | 42.984 |
| 4: | INFINITY | 0.300 | | |
| 5: | 12.806 (ASP) | 2.247 | 1.69350 | 53.201 |
| 6: | −22.355 (ASP) | 0.600~4.166~6.649 | | |
| 7: | 160.098 | 0.500 | 1.83500 | 42.984 |
| 8: | 7.112 | 0.863 | | |
| 9: | −10.046 | 0.450 | 1.83500 | 42.984 |
| 10: | 8.690 | 1.123 | 1.92286 | 20.884 |
| 11: | 167.317 | 6.549~2.982~0.500 | | |
| 12: | 10.470 (ASP) | 1.468 | 1.69350 | 53.201 |
| 13: | −20.925 (ASP) | 1.000 | | |
| 14: | Diaphragm | 6.676~4.289~2.016 | | |
| 15: | 10.551 (ASP) | 1.778 | 1.58313 | 59.460 |
| 16: | −8.678 | 0.500 | 1.84666 | 23.785 |
| 17: | −15.262 | 1.632~4.019~6.291 | | |
| 18: | 290.056 | 0.500 | 1.84666 | 23.785 |
| 19: | 4.274 | 1.616 | 1.48749 | 70.441 |
| 20: | 12.116 | 3.300 | | |
| 21: | 9.938 (ASP) | 1.500 | 1.82121 | 24.060 |
| 22: | 42.003 | 2.250 | | |
| 23: | INFINITY | 1.000 | 1.51680 | 64.198 |
| 24: | INFINITY | 1.120 | | |
| 25: | INFINITY | 0.500 | 1.51680 | 64.198 |
| 26: | INFINITY | | | |

| Surface No. | ε | $A^4$ | $A^6$ | $A^8$ | $A^{10}$ |
|---|---|---|---|---|---|
| 5 | 1 | −0.568516E−04 | 0.306406E−05 | −0.204971E−06 | 0.288123E−08 |
| 6 | 1 | 0.344007E−04 | 0.318929E−05 | −0.244248E−06 | 0.430250E−08 |
| 12 | 1 | −0.221211E−04 | 0.203278E−04 | −0.141299E−05 | 0.205676E−06 |
| 13 | 1 | 0.258952E−03 | 0.279247E−04 | −0.237181E−05 | 0.270745E−06 |
| 15 | 1 | −0.229359E−03 | 0.645370E−05 | −0.122235E−05 | 0.620922E−07 |
| 21 | 1 | −0.546399E−04 | 0.123335E−05 | 0.268354E−06 | −0.737017E−08 |

Symbols in the tables above mean as follows.

F No.: F number

F: focal length

ω: half field angle

R: radius of curvature d: distance from one lens surface to next nd: refractive index for d-line vd: Abbe's number ASP: aspherical surface The shape of the aspherical surface is defined by the formula below.

$$x = \frac{y^2 \cdot c^2}{1 + \sqrt{1 - \varepsilon \cdot y^2 \cdot c^2}} + \Sigma A^i \cdot Y^i$$

where, x: distance from the vertex of the lens surface measured in the optical axis y: height measured in the direction perpendicular to the optical axis C: paraxial curvature measured at the lens vertex ε: conic constant $A^i$: the $i^{th}$ aspherical constant Table 5 below shows the value of fa/fw in the inequality (1) given above which is applicable to each of Examples 1 to 4.

TABLE 5

| Inequality (1) | Example 1 | Example 2 | Example 3 | Example 4 |
|---|---|---|---|---|
| fa/fw | 1.045 | 1.113 | 0.988 | 1.157 |

FIGS. 5A to 16C show aberrations observed in Examples.

FIGS. 5A to 5C are diagrams of aberrations in Example 1, with the zoom lens being adjusted to the end position of the short focal length.

FIGS. 6A to 6C are diagrams of aberrations in Example 1, with the zoom lens being adjusted to a position of the intermediate focal length.

FIGS. 7A to 7C are diagrams of aberrations in Example 1, with the zoom lens being adjusted to the end position of the long focal length.

FIGS. 8A to 8C are diagrams of aberrations in Example 2, with the zoom lens being adjusted to the end position of the short focal length.

FIGS. 9A to 9C are diagrams of aberrations in Example 2, with the zoom lens being adjusted to a position of the intermediate focal length.

FIGS. 10A to 10C are diagrams of aberrations in Example 2, with the zoom lens being adjusted to the end position of the long focal length.

Figures 11A, 11B, 11C:
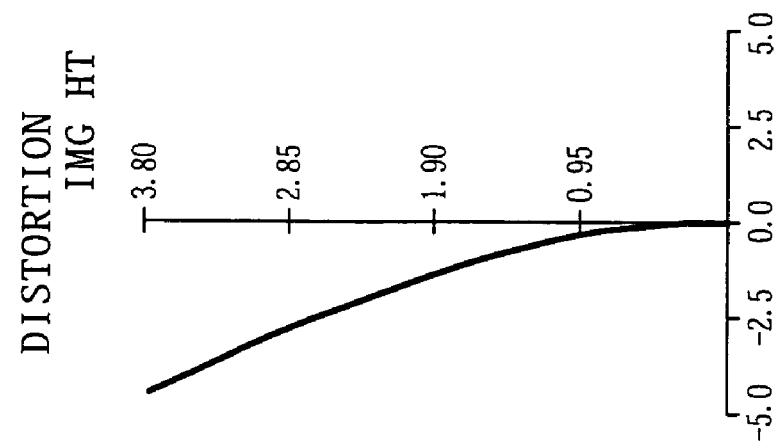
FIGS. 11A to 11C are diagrams showing the aberrations which the zoom lens in the third example experiences when adjusted to the end position of the short focal length.

FIGS. 11A to 11C are diagrams of aberrations in Example 3, with the zoom lens being adjusted to the end position of the short focal length.

FIGS. 12A to 12C are diagrams of aberrations in Example 3, with the zoom lens being adjusted to a position of the intermediate focal length.

FIGS. 13A to 13C are diagrams of aberrations in Example 3, with the zoom lens being adjusted to the end position of the long focal length.

FIGS. 14A to 14C are diagrams of aberrations in Example 4, with the zoom lens being adjusted to the end position of the short focal length.

FIGS. 15A to 15C are diagrams of aberrations in Example 4, with the zoom lens being adjusted to a position of the intermediate focal length.

FIGS. 16A to 16C are diagrams of aberrations in Example 4, with the zoom lens being adjusted to the end position of the long focal length.

In the diagram showing the spherical aberration, the ordinate represents the ratio to the open F value and the abscissa represents the defocus, and the solid line, broken line, and chain line represent respectively spherical aberration due to d-line, c-line, and g-line. In the diagram showing the astigmatism, the ordinate represents the image height and the abscissa represents the focus, and the solid line and broken line represent respectively the sagittal image surface and the meridional image surface. In the diagram showing the distortion, the ordinate represents the image height and the abscissa represents the distortion (%).

The zoom lenses according to the first to fourth examples satisfy the inequality (1) as shown in Table 5. As shown in each diagram of aberration in the Example, each aberration with the zoom lense being adjusted to the wide end position, the intermediate position (between the wide end position and the tele end position), and the tele end position is properly corrected.

The foregoing description is about some preferred embodiments of the disclosure of the invention and it is intended that the configurations and structures of all matter shown as preferred embodiments shall be interpreted as illustrative and not in a limiting sense.

Therefore, the present invention contributes to the improvement (in image forming performance) and miniaturization of the zoom lens to be used for video cameras and digital still cameras.

INDUSTRIAL APPLICABILITY

The zoom lens pertaining to the present invention may be applicable not only to imaging devices such as digital still cameras and digital video cameras but also to other imaging devices to be built into mobile phones, personal computers, and PDA (personal digital assistance).

The invention claimed is:

1. A zoom lens having a plurality of lens groups and varying in power in response to variation in intervals between the lens groups, which comprises a reflecting member to bend the optical axis passing through the lens groups and a last lens group, counted from the object side, which is composed of a negative lens group and a positive lens group, with an air layer interposed between them (arranged sequentially from the object side).

2. The zoom lens as defined in claim 1, wherein the lens groups are constructed such that the first lens group counted from the object side is stationary and contains said reflecting member.

3. The zoom lens as defined in claim 1, wherein the lens groups are constructed such that last lens group counted from the object side has a negative refracting power.

4. A zoom lens having a plurality of lens groups and varying in power in response to variation in intervals between the lens groups, which comprises a last lens group counted from the object side which is composed of a negative lens group and a positive lens group, with an air layer interposed between them (arranged sequentially from the object side).

5. The zoom lens as defined in claim 1, wherein the lens groups are composed of five lens groups.

6. The zoom lens as defined in claim 4, wherein the lens groups are composed of five lens groups.

7. The zoom lens as defined in claim 1, wherein the negative lens group of the last lens group satisfies the condition defined by the inequality (1) below:

$$0.9 < |fa/fw| < 1.25$$

where, fa denotes the focal length of the negative lens group in the last lens group, and fw denotes the focal length at its wide end.

8. The zoom lens as defined in claim 4, wherein the negative lens group of the last lens group satisfies the condition defined by the inequality (1) below:

$$0.9 < |fa/fw| < 1.25$$

where, fa denotes the focal length of the negative lens group in the last lens group, and fw denotes the focal length at its wide end.

9. An imaging device equipped with a zoom lens having a plurality of lens groups and varying in power in response to variation in intervals between the lens groups and also equipped with an imaging element to convert the optical images formed by said zoom lens into electrical signals, wherein said zoom lens comprises a reflecting member to bend the optical axis and a last lens group, counted from the object side, which is composed of a negative lens group and a positive lens group, with an air layer interposed between them (arranged sequentially from the object side).

10. The imaging device as defined in claim 9, wherein the lens groups are constructed such that the first lens group counted from the object side is stationary and contains said reflecting member.

11. The imaging device as defined in claim 9, wherein the lens groups are constructed such that last lens group counted from the object side has a negative refracting power.

12. An imaging device equipped with a zoom lens having a plurality of lens groups and varying in power in response to variation in intervals between the lens groups and also equipped with an imaging element to convert the optical images formed by said zoom lens into electrical signals, wherein said zoom lens comprises a last lens group counted from the object side which is composed of a negative lens group and a positive lens group, with an air layer interposed between them (arranged sequentially from the object side).

13. The imaging device as defined in claim 9, wherein the lens groups are composed of five lens groups.

14. The imaging device as defined in claim 12, wherein the lens groups are composed of five lens groups.

15. The imaging device as defined in claim 9, wherein the negative lens group of the last lens group satisfies the condition defined by the inequality (1) below:

$$0.9 < |fa/fw| < 1.25$$

where, fa denotes the focal length of the negative lens group in the last lens group, and fw denotes the focal length at its wide end.

16. The imaging device as defined in claim 12, wherein the negative lens group of the last lens group satisfies the condition defined by the inequality (1) below:

$$0.9 < |fa/fw| < 1.25$$

where, fa denotes the focal length of the negative lens group in the last lens group, and fw denotes the focal length at its wide end.

* * * * *